United States Patent [19]
Schuetteler

[11] Patent Number: 6,050,560
[45] Date of Patent: Apr. 18, 2000

[54] CLAMPING APPARATUS FOR HOLDING A MOTOR VEHICLE WINDOW PANE

[75] Inventor: Bruno Schuetteler, Wesseling, Germany

[73] Assignee: Ford Global Technologies, Inc., Dearborn, Mich.

[21] Appl. No.: 09/270,558

[22] Filed: Mar. 16, 1999

[51] Int. Cl.[7] ..................................................... B25B 1/08
[52] U.S. Cl. ............................................. 269/234; 269/17
[58] Field of Search ..................................... 269/217, 234; 225/105

[56] References Cited

U.S. PATENT DOCUMENTS

| | | | |
|---|---|---|---|
| 849,354 | 4/1907 | Adams | 269/217 |
| 2,537,803 | 1/1951 | Walters | 269/217 |
| 3,813,090 | 5/1974 | Merola | 269/217 |
| 5,188,268 | 2/1993 | Hakoun et al. | 269/217 |

FOREIGN PATENT DOCUMENTS 28 43 633 C2  4/1980  Germany .

*Primary Examiner*—David A. Scherbel
*Assistant Examiner*—Daniel Shanley
*Attorney, Agent, or Firm*—Joseph W. Malleck

[57] ABSTRACT

Clamping apparatus for holding a motor vehicle window pane wherein a window pane (6) is fixed to and moved in a height-adjustable manner on a driver holder (2) of a window lifting mechanism (1), said clamping means comprising a driver holder (2) having at least one concave surface and a clamping plate (3) which can be braced against the window pane (6) by means of a fastening element (7), with the interposition of spacers (4 and 5), the driver holder (2) and the clamping plate (3) each have a pair of upper and lower recesses (11 and 12 respectively) concave to the window pane (6) and the clamping plate (3) is held parallel to these by prismatic guide means (8/9) on the driver holder (2), the window pane (6) is embraced by directly interposed spacers (4 and 5) having on their outer faces convex upper and lower raised portions (13 and 14 respectively) corresponding to the respective concave recesses (11 and 12), and the window pane, held in a desired installed position by a device, can be clamped fast in the desired position with automatic displacement of the spacers (4 and 5) by tightening the fastening element (7).

4 Claims, 3 Drawing Sheets

CLAMPING APPARATUS FOR HOLDING A MOTOR VEHICLE WINDOW PANE

FIELD OF THE INVENTION

The invention relates to clamping means for holding a motor vehicle window pane wherein a window pane is moved in a height-adjustable manner on a window lifting mechanism and is held in an installed position, determined by a device, by a clamping holder comprising a driver holder having at least one concave surface and a clamping plate, by means of a fastening element, with the interposition of spacers.

BACKGROUND AND PRIOR ART

German specification DE 28 43 633 C2 discloses a clamping holder for a motor vehicle window pane by which a window pane held in alignment in a desired installed position by a device can be clamped fast in this position by tightening the fastening element.

However, this known clamping holder for a motor vehicle window pane has the disadvantage that fitting the window pane in the clamping holder by means of the individual components is difficult and labor-intensive.

OBJECT OF THE INVENTION

The object of the invention is to provide a clamping holder for a motor vehicle window pane which makes it simpler to fit the window pane in the clamping holder and at the same time effects automatic alignment of the window pane with respect to the clamping holder as the assembly is made fast.

SUMMARY OF THE INVENTION

To this end, the invention provides a clamping means for a motor vehicle window pane of the kind referred to wherein (a) the driver holder and the clamping plate each have a pair of upper and lower recesses concave to the window pane and the clamping plate is held parallel to the driver holder by parallel guide means thereon, (b) the window pane is embraced by directly interposed spacers having on their outer faces convex upper and lower raised portions corresponding to the concave recesses, and (c) the window pane, held in a desired installed position by a device, can be clamped fast in the set position, with automatic displacement of the spacers, by tightening the fastening element.

By this apparatus, particularly when the clamping plate is held parallel to the driver holder by a prismatic guide means thereon, a clamping holder is provided, the component parts of which are kept together as they are assembled and can be adjusted automatically.

Advantageously the spacers are provided at their upper ends, directed toward the window shaft of the door, with outwardly-curving portions which form an assembly funnel which merges into the supporting faces facing the window pane.

The concave recesses formed on the driver holder and the clamping plate and the convex raised portions formed on the spacers may have part-cylindrical surfaces, the middle points of which lie substantially on the extended axis of the fastening element, or the cooperating concave and convex raised portions may be formed of part-spherical faces, with the middle points of the spheres lying substantially on the extended axis of the fastening element.

BRIEF DESCRIPTION OF THE DRAWINGS

The invention is described in more detail with reference to an exemplary embodiment shown in the accompanying drawing, in which.

DETAILED DESCRIPTION OF A PREFERRED EMBODIMENT

Figure 2:
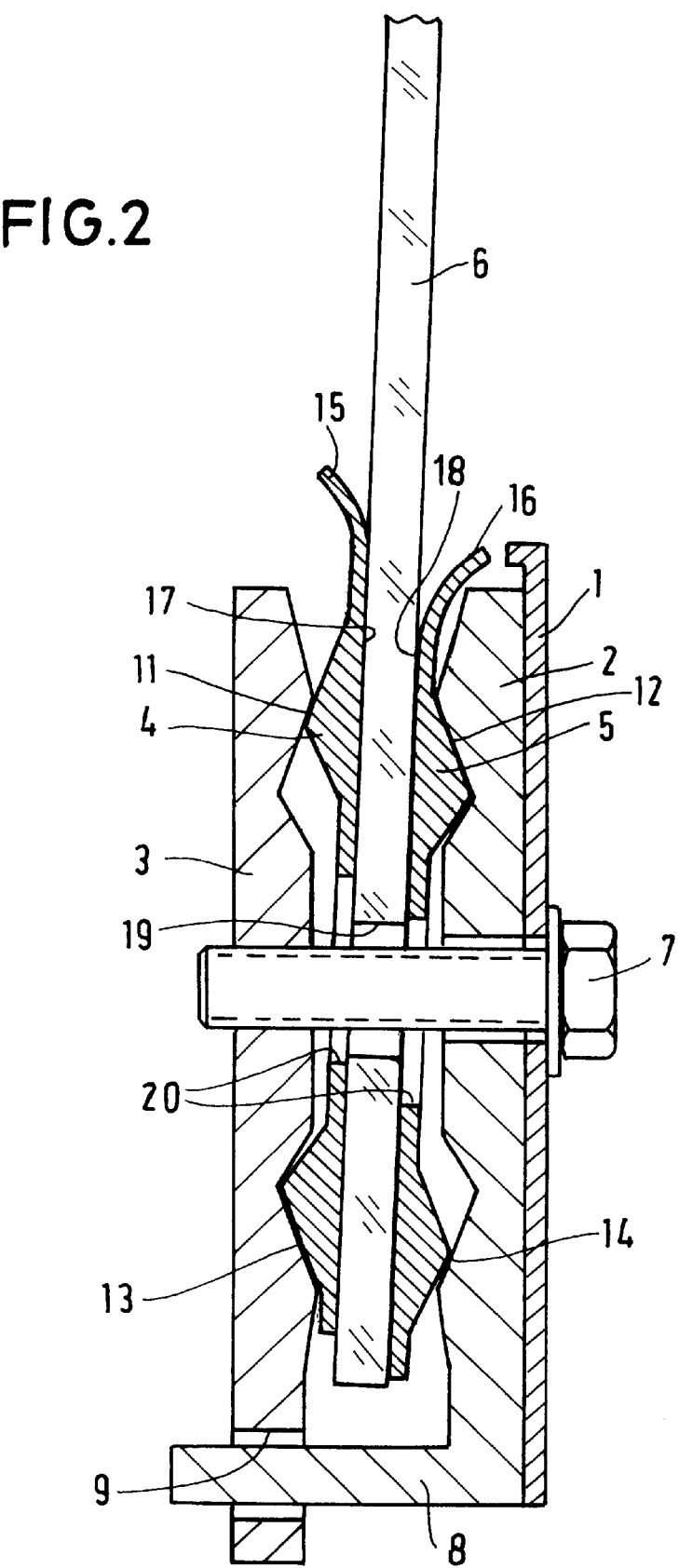
FIG. 2 is a section similar to that of FIG. 1 with the window pine clamped fast in the installed position.
Figure 3:
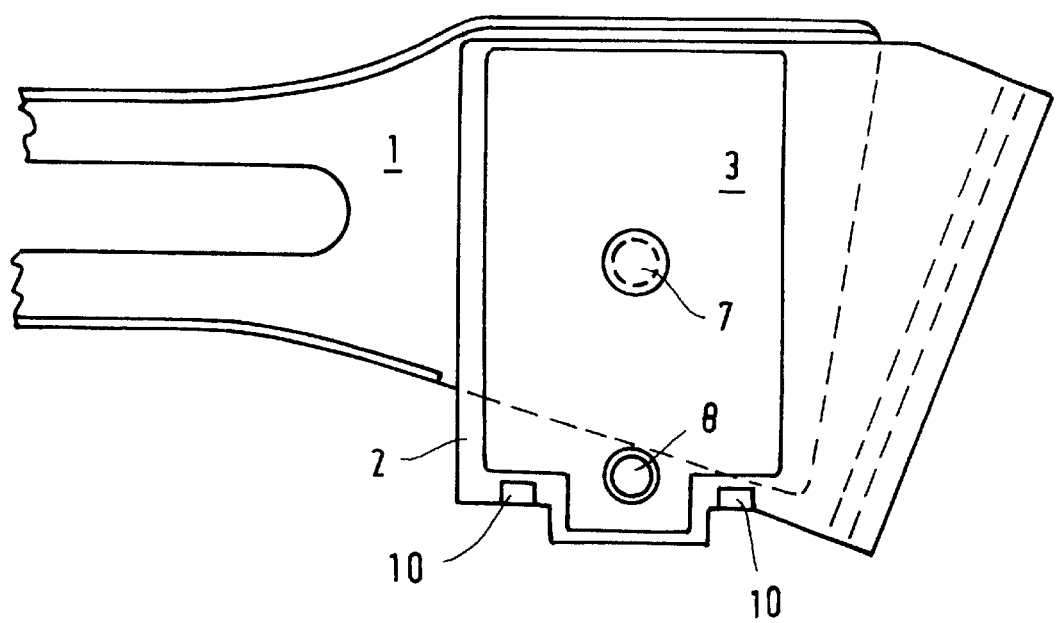
FIG. 3 is a side view of the clamping holder in accordance with the invention.

The clamping holder for a motor vehicle window pane comprises a driver holder 2 connected in a manner not shown in detail to a part 1 of a window lifting mechanism and a clamping plate 3 which acts through interposed spacers 4 and 5 on the window pane 6, the adjusted position of which can be seen from FIG. 2.

The driver holder 2 is tightened against the clamping plate 3 by means of a fastening element 7 in the form of an ordinary screw bolt.

In contrast to the known clamping holder, in which the various individual parts are supplied loose and have to be put together in the correct order during fitting, according to the invention the clamping plate 3 is guided by parallel guide means consisting of a guide pin 8 which cooperates with a bore, and by lateral bridges 10 which cooperate with the lower edge of the clamping plate 3.

The faces of the driver holder 2 and of the clamping plate 3 which face the window pane 6 are provided in this embodiment with cylindrical-concave recesses 11, 12 and 13, 14, which are arranged symmetrically with respect to the fastening element 7.

The spacers 4 and 5 are provided with convex upper and lower raised portions 13 and 14 which correspond to the concave recesses 11 and 12 and again are disposed symmetrically to the fastening element 7 below and above it.

The mutually cooperating surfaces of the concave recesses 11 and 12 and of the convex raised portions 13 and 14 may exhibit ripples or grooves, which after adjustment has been performed assist in retaining the displaced position when the fastening element is tightened.

The spacers 4 and 5 are provided at their upper ends with outwardly facing curved portions 15 and 16 which form an assembly funnel and merge into the faces 17 and 18 which bear on the window pane 6. During assembly the window 6 is thus guided between the spacers 4 and 5 as if in a funnel.

It is also pointed out that in the region where the fastening means 7 passes through them the window pane 6 and the spacers 4 and 5 are provided with enlarged, optionally slot-like, through openings 19 and 20.

Figure 1:
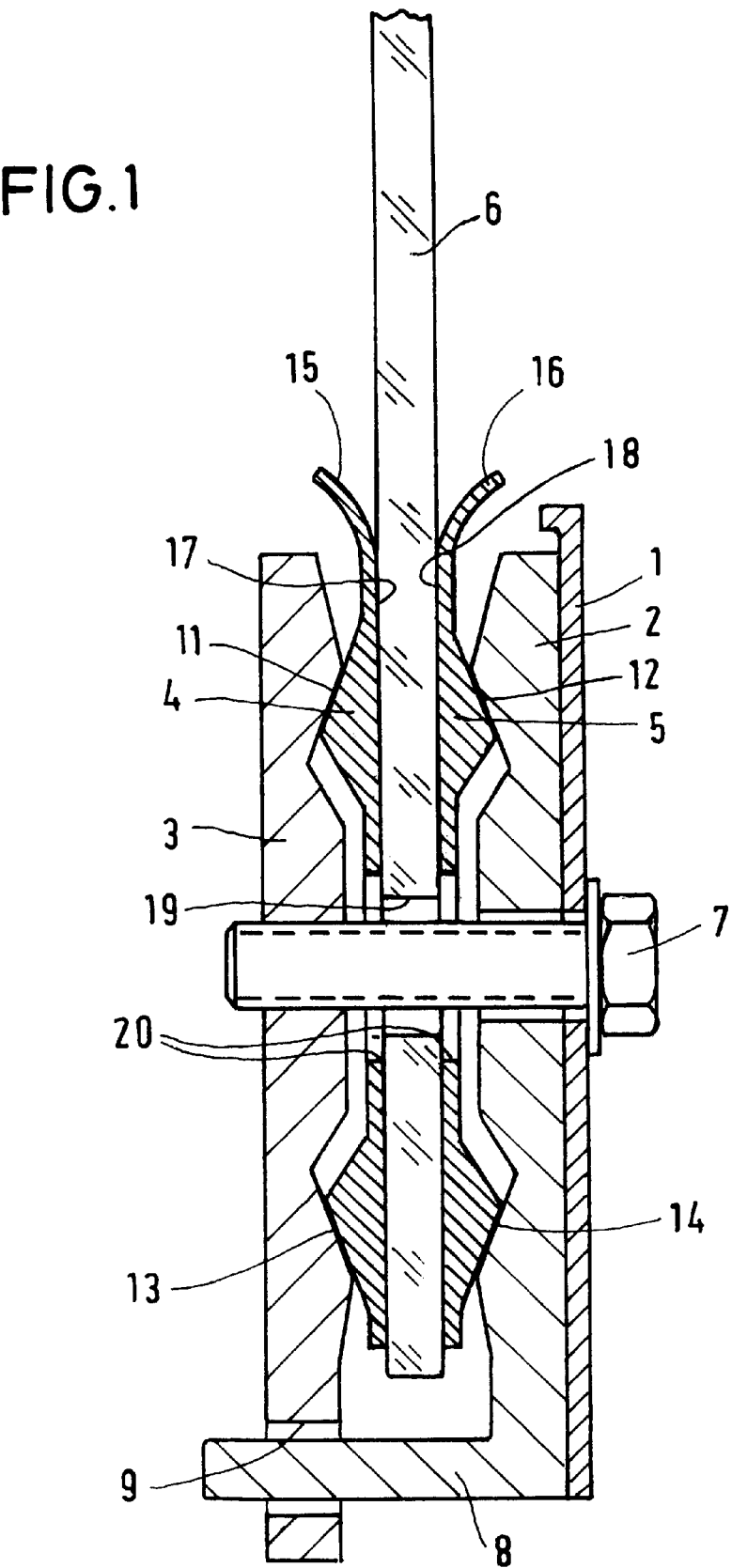
FIG. 1 is a vertical section through a clamping holder for a motor vehicle window pane in accordance with the invention.

In the exemplary embodiment shown in FIG. 1 the concave recesses 11 and 12 and the convex raised portions 13 and 14 form part-cylindrical surfaces the middle points of which lie on the extended axis of the fastening element 7. However, it is possible in the same way to form the concave recesses and convex raised portions as wedge faces or as part-spherical faces, which would make possible not only alignment along a cylindrical surface but also multidimensional alignment along a spherical surface.

During fitting, the driver holder 2 and the clamping plate 3 are disposed in a position in which they are forced apart, and accordingly it is simple to introduce the window pane from above through the so-called window shaft of the door of a motor vehicle, supported by the curved portions 15 and 16, between the two fastening members 2 and 3. Next, the window pane 6 is brought either by hand, or better still by a device, into the desired position to cooperate with the seals on the window opening in the coachwork, and fixed there, and then the fastening element 7 is introduced through the corresponding openings 19 and 20 in the window pane 6 and in the spacers 4 and 5 and screwed into the threaded bore in the clamping plate 3. The spacers 4 and 5 are thereby brought closer to the window pane 6 and bring about a displacement of the convex raised areas 13 and 14 into the concave recesses 11 and 12 in the way indicated in FIG. 2. On further tightening up of the fastening element 7 the spacers 4 and 5, which are now in their final displaced position, are clamped fast.

Thus in the device in accordance with the invention no additional manipulation is necessary in order to effect the alignment of the spacers 4 and 5 relative to the components of the clamping holder, the driver holder 1 and the clamping plate 3.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. Clamping apparatus for holding a window pane in a height-adjusted manner on a window lifting mechanism that has brought the window pane into position for being fixed to window opening seals, comprising:

(a) a driver holder, supported by said lifting mechanism, having a window pane facing surface;

(b) a clamping plate supported relatively movable on said driver holder and having a window pane facing surface that also faces said driver holder facing surface, said driver holder and clamping plate (i) each having a pair of upper and lower recesses in said facing surfaces, and (ii) having cooperative guide means for holding said clamping plate facing surface generally parallel to said driver holder facing surface;

(c) spacers interposed between said facing surfaces and each having convex upper and lower raised portions corresponding respectively to said concave recesses of said facing surfaces; and (d) fastening means effective to tighten and move said facing surfaces together, after a window pane has been inserted between said spacers, causing said window pane to be displaced, clamped and ready for fixing.

2. Clamping apparatus for holding a motor vehicle window pane as claimed in claim 1, wherein the spacers are provided at their upper ends directed towards the window shaft of the door with outwardly-curving portions which form an assembly funnel which merges the supporting faces facing the window pane.

3. Clamping apparatus for holding a motor vehicle window pane as claimed in claim 1, wherein the concave recesses formed on the driver holder and the clamping plate and the convex raised portions formed on the spacers have part-cylindrical surfaces, the middle points of which lie substantially on the extended axis of the fastening element.

4. Clamping apparatus for holding a motor vehicle window pane as claimed in claim 1, wherein the cooperating concave and convex raised portions formed on the carrier holder and on the clamping plate are formed of part-spherical surfaces, with the middle points of the spheres lying substantially on the axis of the fastening element.

* * * * *